United States Patent Office 3,305,451
Patented Feb. 21, 1967

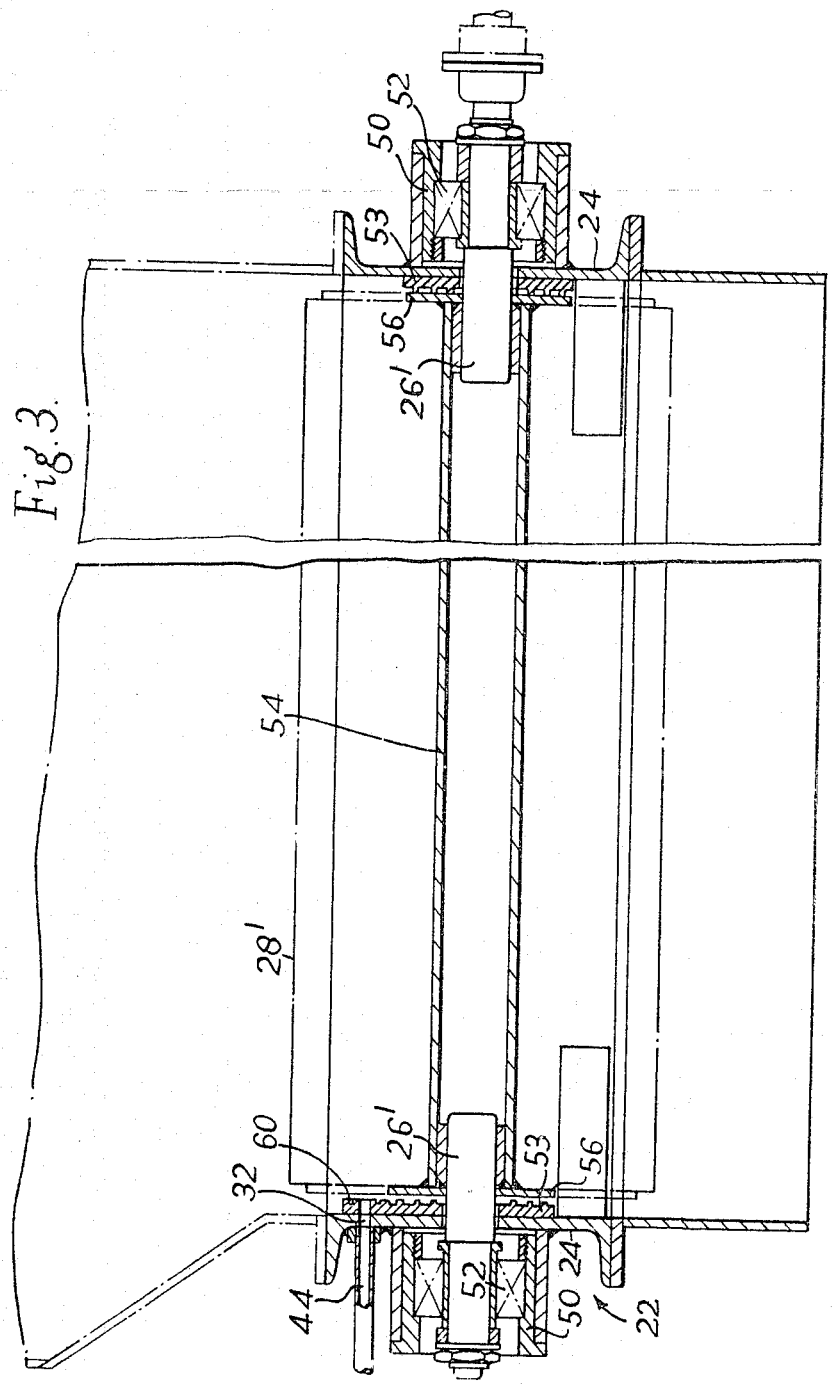

3,305,451
NUCLEAR REACTORS
Peter A. Taylor, Sussex, and Ronald J. Hawkins, Surrey, England, assignors to Babcock & Wilcox Limited, London, England, a corporation of Great Britain
Filed July 1, 1965, Ser. No. 468,792
Claims priority, application Great Britain, July 2, 1964, 27,295/64
6 Claims. (Cl. 176—60)

This invention relates to nuclear reactors and is especially concerned with nuclear reactors having a core and heat exchange means contained within a common pressure vessel.

It has been proposed that the heat exchange means in such a reactor should include several discrete heat exchangers, each providing a primary flow path of fluid to be heated and a secondary flow path through which core coolant, that has been heated by its passage through the core, may flow as the heating fluid. Conveniently the secondary flow paths are connected to a collector to which the core coolant passes from the reactor core so that the core coolant flows from the core to the collector and thence through the secondary flow paths of the heat exchangers.

To enable any heat exchanger to be shut down and put out of use, the secondary flow path of each heat exchanger may be associated with valve means governing the flow of core coolant through the secondary flow path. It is, however, difficult and expensive to provide valve means that, in the rugged conditions existing in a nuclear reactor, can be relied upon to prevent completely the flow of core coolant through the secondary flow path. Since the coolant in the collector is very hot and at a high pressure, the flow through the secondary flow path resulting from even a slight leak at the valve means would contain a considerable quantity of heat which, when the flow of fluid through the primary flow path is cut off as when the heat exchanger is shut down, might well be sufficient to overheat the tube walls of the primary flow path and cause excessive corrosion of the walls.

According to the present invention there is provided a nuclear reactor comprising a core contained within a pressure vessel, a plenum chamber arranged to receive coolant flowing from the core, a plurality of heat exchangers disposed between the core and the pressure vessel wall with each heat exchanger comprising a primary flow path for fluid to be heated and a secondary flow path for the heating fluid. Each heat exchanger is provided with means whereby the core coolant, as the heating fluid, may flow from the chamber through the secondary flow path. A valve means is provided with each heat exchanger which is adjustable between an open and closed position to govern the flow of core coolant through the secondary flow path. Coolant return means is provided whereby core coolant that has flowed in the secondary flow path of another heat exchanger may be passed through the secondary flow path of a first heat exchanger when the valve means of the first heat exchanger is in its closed condition.

Thus, the flow of core coolant from the return means through the secondary flow path will counteract the tendency of hot core coolant to flow through the secondary flow path to overheat the tubes of the primary flow path.

An embodiment of the invention, will now be described, by way of example, with reference to the accompanying partly diagrammatic drawings in which:

FIG. 3 is a section taken on the line III—III of FIG. 2 and looking in the direction of the arrows.

Figure 1:
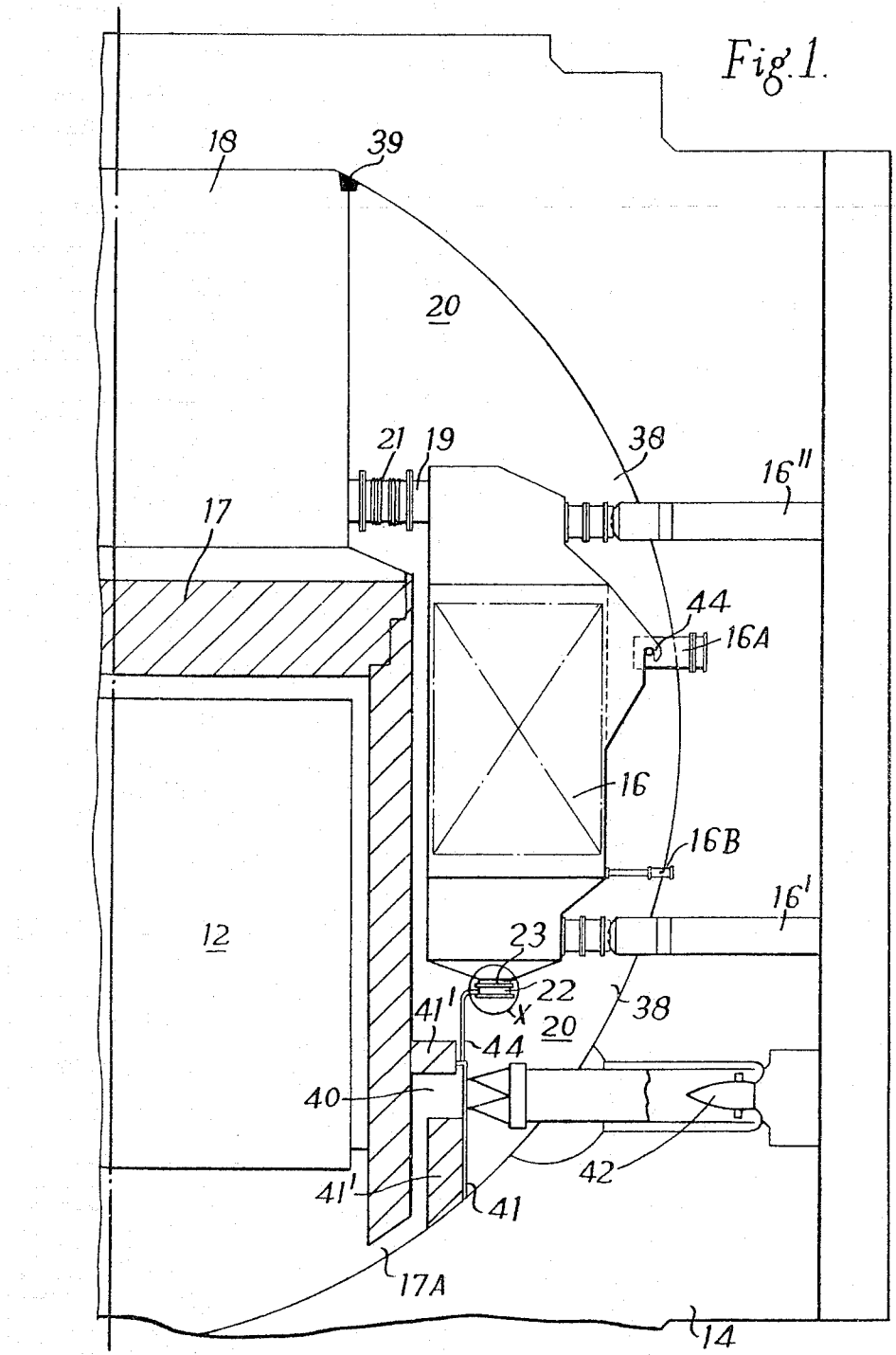
FIG. 1 shows half a sectional elevation of a part of a nuclear reactor arrangement incorporating heat exchangers the full section being symmetrical about its centre line.

FIG. 1 of the drawings illustrates a part of the nuclear reactor and incorporates a core 12 contained within a concrete pressure vessel 14. Sixteen similar heat exchangers 16 are equiangularly disposed around the core between the core and the wall of the pressure vessel. A neutron shield 17 is provided around and over the core, and its lower end is spaced from the pressure vessel wall to form a passage 17A at the bottom of the shielding to permit the entry of the core coolant to the core.

A collector 18 is arranged to receive core coolant flowing from the core and to discharge the coolant as heating fluid to the heat exchangers through ducts 19 incorporating bellows expansion pieces 21. The bellows expansion pieces are provided to accommodate thermal expansion between the heat exchanger casings and the collector.

Each heat exchanger 16 is mounted on support member 16A, which is in the form of a stanchion embedded in the concrete wall of the pressure vessel 14, by means of a hook member 44 secured to the casing of the heat exchanger. A further support member 16B is provided to position the heat exchanger 16 and to prevent any twisting movement. Each heat exchanger comprises a primary flow path constituted by tubes (not shown) contained within a housing. The tubes forming the primary flow path are connected between inlet means 16' and outlet means 16". A secondary flow path through which the heating fluid flows is formed by the spaces between the tubes and the housing.

The core coolant flows from the core 12 to the collector 18 and thence through each duct 19 to the secondary flow path of each heat exchanger and then to a common plenum chamber 20 disposed in the lower part of the space between the core and the wall of the pressure vessel.

The common plenum chamber 20 includes an outer chamber 38, sealed from the collector 18 by sealing member 39, into which the core coolant discharges from the secondary flow path of each heat exchanger and associated valve 22. The plenum chamber 20 also includes an inner chamber 40 defined by the dividing wall 41. Neutron shielding 41' is included in a wall 41 to prevent the entry of radioactive matter into the outer chamber 38 of the plenum chamber 20. Turbo blowers 42 are distributed around and are positioned in the plenum chamber 20 for circulating core coolant from the outer chamber 38 to the inner chamber 40.

Figure 2:
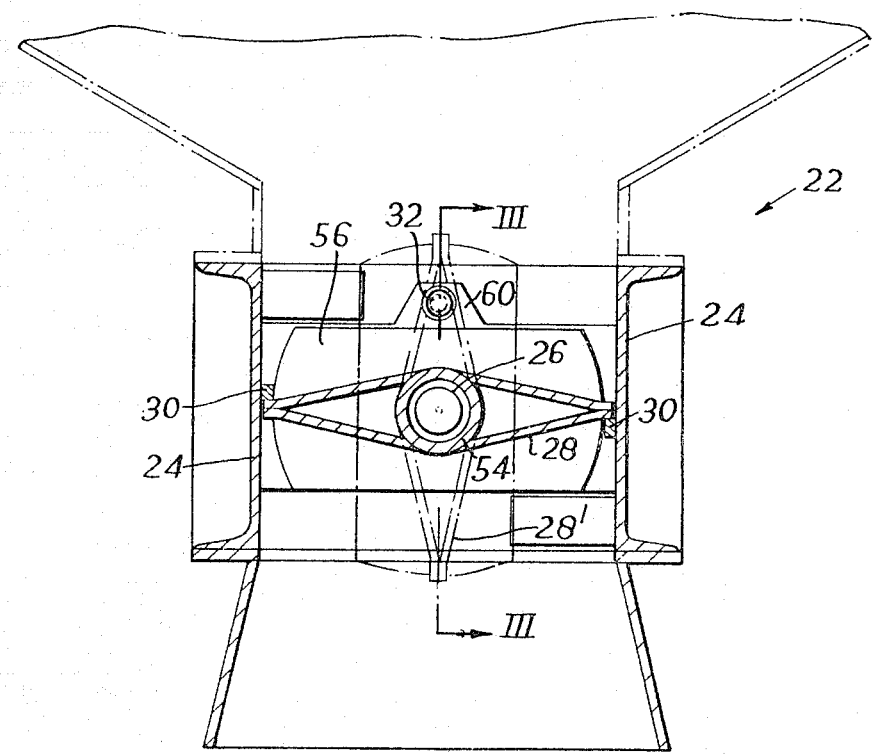
FIG. 2 is an enlarged view of fragmental part of FIG. 1 indicated by the numeral X and depict a valve shown in dotted lines when in the open position and full lines when in the closed position.

Each heat exchanger 16 is provided at the outlet end 23 of its secondary flow path with a butterfly valve 22 (see FIGS. 2 and 3). The butterfly valve 22 comprises a rectangular wall 24 forming the outlet from the housing of the heat exchanger 16 and a centrally located shaft 26 on which is mounted a rotary valve flap shown in dotted lines in the open position as 28' and in the closed position in firm lines as 28. The shaft 26 is supported between a pair of cylindrical members 50 welded to the wall 24 in which are provided bearing blocks 52. A pair of labyrinth gland seals 53 are provided to form a seal between the valve flap and the rectangular wall 24. The shaft 26 is in the form of a tubular member 54 having a stub 26' at each end. Each end of the member 54 is welded to an end sealing plate 56 facing the gland seal 53. A projecting part 60 of trapezoidal shape extends from the gland seal 53 having an aperture to correspond to an orifice 32 in the wall 24. The sealing plate 56 is of substantially rectangular shape and is arranged to cover the orifice 32 when the flap 28 is in the open position in order to inhibit the entry of cooler coolant through the valve means 22 to the secondary flow path of the heat exchanger. Longitudinally extending seal plates 30 extend along opposed side walls of the wall 24 for the flap 28 to cooperate with in order to seal and close the valve. The sealing plate 56 is arranged to inhibit the entry of cooler coolant through the orifice 32 when the flap 28' is in the open position as depicted by dotted lines in FIGS. 2 and 3, and to leave the orifice fully open when the flap is in the closed position in which it is indicated at 28.

The return means to the secondary flow path of any heat exchanger includes a conduit 44 through which core coolant may flow from the inner chamber 40, to which one end of the conduit is connected, to the orifice 32 to which the other end of the conduit extends.

In operation, the core coolant is circulated by means of the turbo-blowers 42. After being heated in the core 12 the coolant flows by way of the collector 18 through the duct 19 to each heat exchanger and through its associated secondary flow path and subsequently discharges through the valve means 22 to the outer chamber 38. From the chamber 38, the coolant flows through the blowers 42 into the inner chamber 40 and thence through the annular passage 17A provided below the neutron shielding 17. In the event of it being desired to put any of the heat exchangers 16 out of operation, the valve means 22 of that heat exchanger 16 is closed and the supply of primary fluid is discontinued.

The core coolant, after its passage through the secondary flow paths of the other heat exchangers, discharges into the chamber 20 at a considerably lower temperature and pressure than the temperature and pressure prevalent at the collector 18. The cooler gas circulated by the blowers 42 into inner chamber 40 is at a considerably higher pressure than in the collector 18. The coolant thus flows from the inner chamber 40 by way of the conduit 44 to the secondary flow path of the heat exchanger 16 that has been taken out of operation in order to cool that heat exchanger and prevent any damage to its structure and tubes.

The valve means 22 used for core coolant flow is chosen as a matter of economy and is of such a design that it cannot be relied upon positively to prevent the flow of core coolant through the secondary flow path but will only reduce the flow to a fraction of its maximum flow. Such valve means as used herein may be available much more cheaply than the valve means that would have been required had a far higher degree of reliability been called for.

While in accordance with the provisions of the statutes there is illustrated and described herein a specific embodiment of the invention, those skilled in the art will understand that changes may be made in the form of the invention covered by the claims, and that certain features of the invention may sometimes be used to advantage without a corresponding use of the other features.

What is claimed is:

1. A nuclear reactor comprising a pressure vessel, a core arranged within said pressure vessel, a plenum chamber arranged to receive coolant flowing from the core, a plurality of heat exchangers disposed between the core and the pressure vessel wall, each heat exchanger comprising a primary flow path for fluid to be heated and a secondary flow path for the heating fluid, each heat exchanger being provided with means whereby core coolant as heating fluid may flow from said plenum chamber through the secondary flow path, valve means provided with each heat exchanger adjustable between an open and close position to control the flow of core coolant through the secondary flow path, and coolant return means for passing core coolant that has flowed in the secondary flow path of another heat exchanger through the secondary flow path of said first heat exchanger when the valve means of the first heat exchanger is in the closed position.

2. A nuclear reactor comprising a pressure vessel, a core arranged within said pressure vessel, a plenum chamber arranged to receive coolant flowing from the core, a plurality of heat exchangers disposed between the core and the pressure vessel wall, each heat exchanger comprising a primary flow path for fluid to be heated and a secondary flow path for the heating fluid, each heat exchanger being provided with means whereby core coolant as heating fluid may flow from said plenum chamber through the secondary flow path, valve means provided at the outlet ends of the secondary flow paths of each heat exchanger adjustable between an open and closed position to control the flow of core coolant through the secondary flow path, and coolant return means for passing core coolant that has flowed in the secondary flow path of another heat exchanger through the secondary flow path of said first heat exchanger when the valve means of the first heat exchanger is in the closed position.

3. A nuclear reactor comprising a pressure vessel, a core arranged within said pressure vessel, a plenum chamber arranged to receive coolant flowing from the core, a plurality of heat exchangers disposed between the core and the pressure vessel wall, each heat exchanger comprising a primary flow path for fluid to be heated and a secondary flow path for the heating fluid, each heat exchanger being provided with means whereby core coolant as heating fluid may flow from said plenum chamber through the secondary flow path, valve means provided at the outlet ends of the secondary flow paths of each heat exchanger adjustable between an open and closed position to control the flow of core coolant through the secondary flow path, and coolant return means including an orifice for passing core coolant that has flowed in the secondary flow path of another heat exchanger through the secondary flow path of said first heat exchanger, and closure means for closing the orifice which is controlled by said valve means of said first heat exchanger, said orifice arranged to be open when the valve means is fully closed and to be closed when the valve means is fully open.

4. A nuclear reactor comprising a pressure vessel, a core arranged within said pressure vessel, a plenum chamber arranged to receive coolant flowing from the core, a plurality of heat exchangers disposed between the core and the pressure vessel wall, each heat exchanger comprising a primary flow path for fluid to be heated and a secondary flow path for the heating fluid, each heat exchanger being provided with means whereby core coolant as heating fluid may flow from said plenum chamber through the secondary flow path, valve means provided at the outlet ends of the secondary flow paths of each heat exchanger adjustable between an open and closed position to control the flow of core coolant through the secondary flow path, and coolant return means including an orifice for passing core coolant that has flowed in the secondary flow path of another heat exchanger through the secondary flow path of said first heat exchanger when the valve means of the first heat exchanger is in the closed position, said valve means including a rotary flap for opening and closing the valve means, said flap being arranged to close the orifice when the valve is in the open position and to open the orifice when the valve is in the closed position.

5. A nuclear reactor comprising a pressure vessel, a core arranged within said pressure vessel, a plenum chamber arranged to receive coolant flowing from the core, a plurality of heat exchangers disposed between the core and the pressure vessel wall, each heat exchanger comprising a primary flow path for fluid to be heated and a secondary flow path for the heating fluid, each heat exchanger being provided with means whereby core coolant as heating fluid may flow from said plenum chamber through the secondary flow path, said secondary flow paths arranged to discharge into a common outlet plenum chamber, valve means provided at the outlet ends of the secondary flow paths of each heat exchanger which are adjustable between an open and closed position to control the flow of core coolant through the secondary flow path, and coolant return means including an orifice arranged in the outlet ends of the secondary flow paths for passing core coolant that has flowed in the secondary flow path of another heat exchanger from the outlet plenum chamber through the secondary flow path of said first heat exchanger when the valve means of the first heat exchanger is in the closed position, said valve means including a rotary flap for opening and closing the valve means, said flap being arranged to close the orifice when the valve is in the open position and to open the orifice when the valve is in the closed position.

6. A nuclear reactor comprising a pressure vessel, a core arranged within said pressure vessel, a plenum chamber arranged to receive coolant flowing from the core, a plurality of heat exchangers disposed between the core and the pressure vessel wall, each heat exchanger comprising a primary flow path for fluid to be heated and a secondary flow path for the heating fluid, each heat exchanger being provided with means whereby core coolant as heating fluid may flow from said plenum chamber through the secondary flow path, said secondary flow paths arranged to discharge into a common outlet plenum chamber, said outlet plenum chamber including an outer chamber receiving coolant from said secondary flow paths and an inner chamber connected to the inlet of said core, a pump means arranged to circulate said coolant from the outer chamber to the inner chamber, valve means provided at the outlet ends of the secondary flow paths of each heat exchanger which are adjustable between an open and closed position to control the flow of core coolant through the secondary flow path, and coolant return means including an orifice arranged in the outlet ends of the secondary flow paths for passing core coolant that has flowed in the secondary flow path of another heat exchanger from the inner chamber of said outlet plenum chamber through the secondary flow path of said first heat exchanger when the valve means of the first heat exchanger is in the closed position, said valve means including a rotary flap for opening and closing the valve means, said flap being arranged to close the orifice when the valve is in the open position and to open the orifice when the valve is in the closed position.

No references cited.

REUBEN EPSTEIN, *Primary Examiner.*